United States Patent [19]
Kuch et al.

[11] 3,725,404
[45] Apr. 3, 1973

[54] 2-AMINO-4,4-DI-SUBSTITUTED-4H-3,1-BENZOXAZINES

[75] Inventors: Heinz Kuch; Karl Schmitt; Gunther Seidl; Irmgard Hoffmann, all of Bad Soden, Taunus, Germany

[73] Assignee: Farbwerke Hoechst Aktigengsellschaft vormals Meister, Lucius & Bruning, Frankfurt/Main, Germany

[22] Filed: June 9, 1971

[21] Appl. No.: 151,599

Related U.S. Application Data

[63] Continuation-in-part of Ser. No. 682,631, Nov. 13, 1967, abandoned.

[30] Foreign Application Priority Data

Nov. 24, 1966   Germany..............................F 50751

[52] U.S. Cl.........260/244 R, 260/482 R, 260/552 R, 260/553 A, 260/575, 260/578, 424/248
[51] Int. Cl..............................................C07d 87/20
[58] Field of Search....................................260/244 R

[56] References Cited

UNITED STATES PATENTS 3,417,085   12/1968   Kuch et al......................260/243

FOREIGN PATENTS OR APPLICATIONS 6,607,386   12/1966   Netherlands......................260/244 R
1,571,287   6/1969   France.............................260/244 R

OTHER PUBLICATIONS

Chemical Abstracts, Vol. 68, No. 21941b (1968). QDI.A51.

*Primary Examiner*—Natalie Trousof
*Attorney*—Curtis, Morris & Safford

[57] ABSTRACT

2-Amino-4,4-di-substituted benzoxazine derivatives and the salts thereof with a physiologically compatible acid have an action on the central nervous system. These benzoxazines have the formula

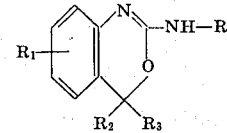

in which R is hydrogen, alkyl of one to four carbon atoms, cyclohexyl, phenyl or benzyl, $R_1$ is hydrogen, halogen, trifluoromethyl, $R_2$ is alkyl of one to four carbon atoms and $R_3$ is phenyl or halophenyl.

15 Claims, No Drawings

2-AMINO-4,4-DI-SUBSTITUTED-4H-3,1-BENZOXAZINES

This application is a continuation-in-part-application of our co-pending application Ser. No. 682 631 filed Nov. 13, 1967, now abandoned.

The present invention provides new 3,1-benzoxazine derivatives having valuable pharmacological properties and a process for their manufacture.

More particularly, the present invention provides derivatives of 4H-3,1-benzoxazine of the general formula (I)

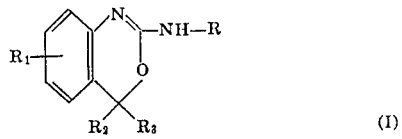

in which R is hydrogen, alkyl of one to four carbon atoms, cyclohexyl, phenyl or benzyl, $R_1$ is hydrogen, halogen, trifluoromethyl, $R_2$ is alkyl of one to four carbon atoms and $R_3$ is phenyl or halophenyl, and their salts with physiologically compatible acids. Compounds in which R is methyl or ethyl, $R_1$ is chlorine, $R_2$ is methyl and $R_3$ is phenyl or 2-chlorophenyl are preferred.

These compounds possess valuable pharmacological properties, especially a depressive effect on the central nervous system as well as anticonvulsant, tranquillizing and narcosis-prolonging effects and in addition also, for example, analgesic properties, combined with extremely low toxicity. According to the present invention, the new compounds of the general formula (I) are obtained when a. a compound of the general formula (II)

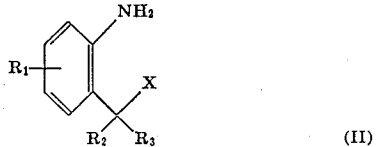

in which $R_1$ to $R_3$ have the above meanings and X represents a chlorine or bromine atom or a hydroxyl, alkoxy or alkanoyloxy group - is reacted with an isocyanate of the general formula (III)

$$O = C = N - R \quad (III)$$

in which R has the above meaning or with a corresponding compound forming isocyanate, if required or desired with addition of an acid or a dehydrating agent; or b. a compound of the general formula (IV)

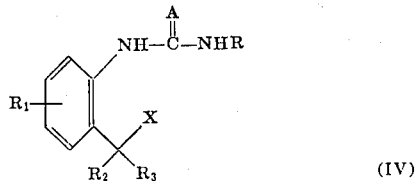

in which R, $R_1$ to $R_3$ and X have the above meanings and A stands for oxygen or sulphur — or a corresponding functional derivative of these ureas and thioureas—is treated with an acid or a dehydrating agent when A stands for an oxygen atom, or with an agent that splits off sulphur, if desired or required with simultaneous or subsequent acid treatment, when A stands for a sulphur atom; or c. a compound of the general formula II is reacted with a cyanogen halide of the general formula (V)

$$Y - C \equiv N \quad (V)$$

in which Y represents a chlorine, bromine or iodine atom; if desired followed by an acid treatment; or d. a compound of the general formula (VI)

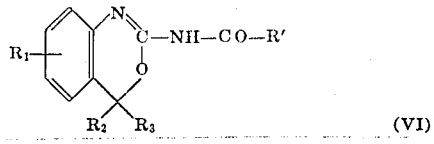

in which $R_1$ to $R_3$ have the above meanings and R' represents an alkyl, alkenyl, aralkyl, halogenalkyl or aryl radical or a lower dialkylaminoalkyl group, in which the dialkylamino group may form a ring, if desired together with an oxygen or a sulphur atom or an imino group substituted by a methyl or benzyl residue, is saponified or reduced with a complex metal hydride and, when R' represents a halogenalkyl group, the compound VI is reacted, before or after reduction of the acyl group, with a dialkylamine which, as defined for R, may also form a ring; and if desired to obtain salts, a resulting basic compound is converted into an acid addition salt thereof by treatment with an inorganic or organic acid, that is physiologically tolerable.

As starting materials of the general formula II for the reaction according to (a) there are preferably used $\alpha$, $\alpha$-disubstituted 2-aminobenzyl alcohols; the following may be used: $\alpha$, $\alpha$-Dimethyl-2-aminobenzyl alcohol, $\alpha,\alpha$-dimethyl-2-amino-chlorobenzyl alcohols, $\alpha,\alpha$-dimethyl-2-aminobromobenzyl alcohols, $\alpha,\alpha$-dimethyl-2-aminonitrobenzyl alcohols, $\alpha,\alpha$-diethyl-2-aminobenzyl alcohol, $\alpha,\alpha$-diethyl-2-aminofluorobenzyl alcohols, $\alpha,\alpha$-diethyl-2-aminochlorobenzyl alcohols, $\alpha,\alpha$-diethyl-2-aminomethoxybenzyl alcohols, $\alpha,\alpha$-dipropyl-2-aminobenzyl alcohol, $\alpha,\alpha$-dipropyl-2-aminochlorobenzyl alcohols, $\alpha,\alpha$-dipropyl-2-aminotrifluoromethylbenzyl alcohols, $\alpha,\alpha$-dibutyl-2-aminobenzyl alcohol, $\alpha,\alpha$-dibutyl-2-aminochlorobenzyl alcohols, $\alpha,\alpha$-diphenyl-2-aminochlorobenzyl alcohols, $\alpha$-methyl-$\alpha$-ethyl-2-aminobenzyl alcohols, $\alpha$-methyl-$\alpha$-ethyl-2-aminochlorobenzyl alcohols, $\alpha$-methyl-$\alpha$-propyl-2-amino-benzyl alcohol, $\alpha$-methyl-$\alpha$-propyl-2-aminobromo-benzyl alcohols, $\alpha$-methyl-$\alpha$-cyclohexyl-2-amino-chlorobenzyl alcohols, $\alpha$-methyl-$\alpha$-benzyl-2-aminochlorobenzyl alcohols, $\alpha$-methyl-$\alpha$-phenyl-2-aminobenzyl alcohol, $\alpha$-methyl-$\alpha$-phenyl-2-aminochlorobenzyl alcohols, especially $\alpha$-methyl-$\alpha$-phenyl-2-amino-5-chlorobenzyl alcohol, $\alpha$-methyl-$\alpha$-phenyl-2-aminonitrobenzyl alcohols, $\alpha$-methyl-$\alpha$-methoxyphenyl-2-aminochlorobenzyl alcohols, $\alpha$-ethyl-$\alpha$-butyl-2-aminobenzyl alcohol, $\alpha$-ethyl-$\alpha$-phenyl-2-aminobenzyl alcohol, $\alpha$-ethyl-$\alpha$-phenyl-2-aminochlorobenzyl alcohols, especially $\alpha$-ethyl-$\alpha$-phenyl-2-amino-5-chlorobenzyl alcohol, $\alpha$-ethyl-$\alpha$-chlorophenyl-2-aminochlorobenzyl alcohols, $\alpha$-isopropyl-$\alpha$-phenyl-2-aminochloro-benzyl alcohols, $\alpha$-isobutyl-$\alpha$-phenyl-2- aminochlorobenzyl alcohols, in which the substituents following upon "2-amino" may be in position 3, 4, 5 or 6 of the benzene ring.

Further suitable are the lower 0-alkyl ethers corresponding to the benzyl alcohols mentioned above, for example α-methyl-α-phenyl-2-amino-5-chlorobenzyl alcohol methyl or ethyl ether, the corresponding halides such as diphenyl-2-aminophenyl-chloromethane or -bromomethane, or the corresponding esters with lower aliphatic carboxylic acids, for example the acetates or propionates of the benzyl alcohols mentioned. The salts with strong acids, such as hydrohalic acids, sulphuric acid, benzenesulphonic or toluenesulfphonic acid, derived from the basic compounds mentioned above, are likewise suitable starting materials.

The benzyl alcohols mentioned above can be manufactured in known manner, for example by reacting suitably substituted anthranilic acid esters or corresponding 2-aminophenylketones with Grignard reagents.

Suitable starting materials of the general formula III are isocyanic acid and isocyanates such as methyl, ethyl-, propyl-, isopropyl-, butyl-, isobutyl-, hexyl-, cyclohexyl-, allyl-, cyclohexenyl-, phenyl-, benzyl-, dimethylaminopropylisocyanate, also isocyanate formers (cf. Houben Weyl, "Methoden der organischen Chemie," 4th edition, vol. 8, pages 119 – 127), such as the corresponding carbamic acid chlorides and urethanes.

The reaction of the compounds of the formula II and of their acid addition salts with the compounds of the general formula III is carried out within the temperature range from 0 to 200°C, preferably from 20 to 130°C. Suitable solvents or diluents are water, lower alcohols such as methanol, ethanol, isopropanol, ethers such as diethyl ether, tetrahydrofuran, dioxane, also glycol, glycol monomethyl and monoethyl ether, di- and tri-ethyleneglycol as well as aromatic hydrocarbons such as benzene, toluene or xylene, or chlorinated hydrocarbons such as chlorobenzene, chloroform, methylenechloride, trichlor-ethylene or tetrachlorethane. The suitability of the solvent or diluent depends on the stability and reactivity of the individual reactants.

The intermediately formed urea derivatives, which can be isolated as intermediate products, are then advantageously converted into the process products by treating the reaction mixture or the isolated urea derivatives with inorganic or organic acids or with dehydrating agents. Depending on the reaction speed, it may be advantageous to perform this treatment at an elevated temperature.

In the reaction of the halides of the general formula II (X = chlorine or bromine) or of their acid addition salts with the compounds of the general formula III the presence of acids or dehydrating agents is in general not needed for the cyclization of the intermediately formed urea derivatives.

The reaction times depend on the reactivity of the components and the chosen temperature, and can be varied within wide limits.

For working up the reaction products of the general formula I, which are in most cases obtained in the form of salts, can be directly isolated, if necessary after having concentrated the reaction solution and then, if desired, converted into the free bases by treatment with an alkali. Alternatively, the reaction mixture can be rendered alkaline before the isolation, and in this case the process products can be isolated in usual manner in the form of the free bases.

The starting materials of the general formula IV, which are required for the reaction according to (b), in which A represents an oxygen atom, are obtained, for example, by reacting a compound of the general formula II, in which X stands for a halogen atom or a hydroxyl, alkoxy or alkanoyloxy group, with an isocyanate of the general formula $$R - N = C = O$$

in which R has the meaning defined above.

Instead of the compounds of the general formula IV there may be used in the reaction according to (b) the functional derivatives of these ureas, for example compounds that contain instead of the urea grouping a prestage thereof, such as the carbodiimide group, guanidino or dichloroformic acid amidine group, whereby the process products are likewise obtained.

The starting materials of the general formula IV, in which A represents a sulphur atom, required for the reaction according to (b), are obtained, for example, when a compound of the general formula II is reacted with an isothiocyanate of the general formula R—N=C=S, where R has the meaning defined above. Isothiocyanates suitable for this purpose are methyl-, ethyl-, propyl-, isopropyl-, butyl-, isobutyl-, hexyl-, cyclohexyl-, allyl-, cyclopentenyl-, phenyl-, benzyl-, dimethylaminoethyl-, piperidinoethyl-, morpholinoethyl-, N-methylpiperazinoethyl-, diethylaminorpopyl-, pyrrolidino-propyl-, morpholinopropyl-, N-benzylpiperazinopropyl-isothiocyanate. Furthermore, instead of the isothiocyanates there may be used isothiocyanate formers (cf. Houben-Weyl, "Methoden der organischen Chemie," 4th edition, vol. 9, pages 867 – 878), such as the corresponding thiourethanes or dithiocarbamic acid esters.

To desulphurize the thioureas of the general formula IV they are reacted with agents that split off sulphur, such as heavy-metal oxides or heavy-metal salts, for example mercury oxide, silver oxide, lead oxide, arsenic trioxide, lead acetate, silver nitrate, mercury chloride or with oxidants such as sodium hypochlorite or sodium nitrite. The carbodiimides intermediately formed in this reaction are in general not isolated; for example in the case of compounds of the general formula IV, in which X represents the hydroxyl group, they are readily converted into the process products under the reaction conditions, whereas in the case of compounds of the general formula IV, in which X is an alkoxy or alkanoyloxy group, simultaneous or subsequent treatment with an inorganic or organic acid is needed.

The reaction is carried out within the temperature range form 20 to 200°C, preferably from 50 to 120°C. The reaction times vary from 15 minutes to 30 hours.

The reaction medium used is water, a lower alcohol such as methanol, ethanol or isopropanol, or an ether such as diethyl ether, tetrahydrofuran, dioxane, a glycol, glycol monomethyl or monoethyl ether, or an aromatic hydrocarbon such as benzene, toluene or xylene or chlorinated hydrocarbon such as methylenechloride, chloroform, dichlorethane or trichlor-ethylene, or acetone or carbon disulphide, or mixtures thereof. The choice of suitable solvent depends on the stability and reactivity of the reactants and reaction products concerned.

The reaction of the compounds of the general formula II with cyanogen halides according to (c) is preferably carried out in the presence of a weak base, for example an alkali or alkaline earth metal salt of a fatty acid such as sodium acetate, an alkali or alkaline earth metal carbonate, bicarbonate or hydroxide, at a temperature from −20 to 100°C for a period of 30 minutes to 30 hours. Suitable solvents and diluents are aqueous or anhydrous organic solvents, for example, lower alcohols such as methanol, ethanol or isopropanol, ethers such as diethyl ether, tetrahydrofuran or dioxane, aromatic hydrocarbons such as benzene, toluene or xylene, chlorinated hydrocarbons such as methylene-chloride, chloroform, dichlorethane, or chlorobenzene, also acetone or pyridine, or mixtures thereof. The intermediately formed cyanamide derivatives are converted into the process products either spontaneously or on treatment with acids with cyclization.

The starting materials of the general formula VI for the reaction according to (d) are obtained, for example, when compounds of the general formula I, in which R represents a hydrogen atom, are acylated in usual manner with a carboxylic acid halide or anhydride or reacted with the corresponding free carboxylic acids, with the use of dehydrating agents, for example carbodiimides such as dicyclohexyl carbodiimide or chloroformic acid ethyl ester in admixture with tertiary amines such as triethylamine or pyridine.

It is also possible to react compounds of the general formula II with acylisocyanates or acyl isothiocyanates of the general formula R′—CO—N=C=O and R′—CO-N=C=S respectively (where R′ has the above meaning) and to convert the resulting acylureas and acylthioureas respectively into the compounds VI according to (b).

The compounds of the general formula VI obtained in this manner are then converted into the process products by reduction in the usual manner with complex metal hydrides, such as lithium-aluminum hydride. The reduction is carried out in an inert solvent, preferably in an ether such as dioxane, ether, tetrahydrofuran, if required or desired in admixture with an aromatic hydrocarbon, at a temperature ranging from 0° to the boiling temperature of the solvent used.

When halogenacyl compounds are used, they may first be reacted with the corresponding amines such as dimethylamine, diethylamine or dipropylamine or with the corresponding hetertocyclic amines such as piperidine, pyrrolidine, morpholine, or N-methylpiperazine or N-benzylpiperazine, or first the reduction described above is performed and the resulting halogenalkyl compounds are then reacted with the said amines in the usual manner, for which purpose an excess of amine to combine with the liberated hydrogen halide is advantageous.

Being basic compounds, the process products can be converted with inorganic or organic acids into the corresponding salts. Suitable inorganic acids are, for example, hydrohalic acids such as hydrochloric and hydrobromic acid also sulphuric phosphoric and amidosulphonic acid. As examples of organic acids there may be mentioned acetic, propionic, lactic, glycolic, gluconic, fumaric, maleic, oxalic, succinic, malic, tartaric, citric, benzoic, salicyclic, aceturic, hydroxy-ethanesulphonic, ethylenediaminetetraacetic, embonic, naphthalenedisulphonic or toluenesulphonic acid.

The compounds obtained by the present process have extremely low toxicity and even when given in small doses they display a depressive action on the central nervous system and therefore are useful as tranquilizers; further a prolonged activity is observed. In addition, the compounds also have a good anticonvulsant and muscle relaxing effect.

The process products are distinctly superior in the above given respects in their activity to the known 2-ethyl-amino-4H-3,1-benzoxazine. Thus, for example, the 2-ethylamino-4-methyl-4-phenyl-6-chloro-4H-3,1-benzoxazine of this invention is substantially less toxic than the control substance, but at the same time it is a stronger sedative. Furthermore, 2-ethylamino-4-methyl-4-phenyl-6-chloro-4H-3,1-benzoxazine has anticonvulsant properties and also a muscle relaxing and narcosis-extending activity which are absent from the control substance. The central-depressive activity which corresponds to the above-named sedative effect, was tested by recording the spontaneous and the provoked motility in the mouse and in the somnolence test (Nieschulz, O. et al., "Arzneimittelforschung" 6, page 651 (1956)) and the narcosis extension in the usual manner. The anticonvulsant activity was tested as antagonism towards the action of pure nicotine alkaloid and 1,5-pentamethylenetetrazole by the usual laboratory methods.

The central-depressive action was further tested as anticonvulsant activity in the Metrazole test comparing five compounds of the invention with five compounds as known from U.S. Pat. No. 3,417,085 and closely related in structure.

In the following, the known compounds are listed sub (a), whereas the compounds of this invention are listed sub (b):

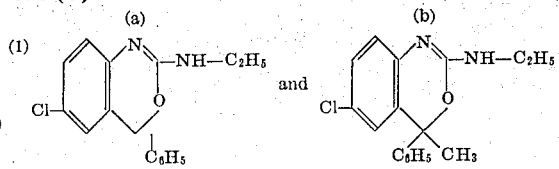

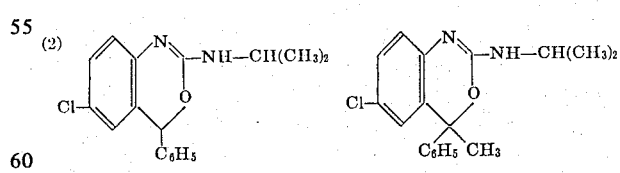

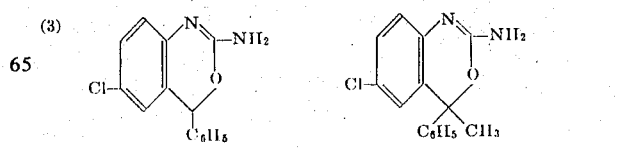

(4) 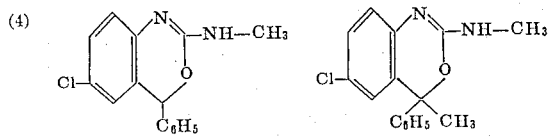

(5) 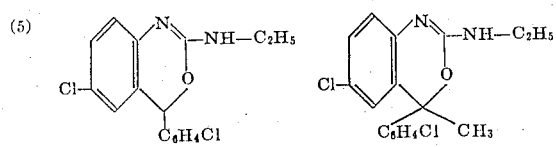

The degree of anticonvulsant activity was determined as antagonism against the spasm-causing action of penta-methylene-tetrazole (Metrazole). In this test, increasing amounts of the test compounds were administered orally to white mice. Thirty minutes after administration each animal was injected intraperitoneally with an aqueous solution of 60 milligrams per kilogram body weight of Metrazole. It was determined which dose of the test compounds efficiently counteracts the paroxysm normally caused by Metrazole in 50 percent of the test animals (effective dose$_{50}$ = ED$_{50}$ ). This was compared with the oral toxicity of the compounds expressed in LD$_{50}$, i.e., the dose that kills 50 percent of the test animals. The results are compiled in the following Table:

TABLE

| Cpd. | LD$_{50}$ [mg/kg] | No. of test animals | Antagonism against metrazol, 50% effective dose [ED$_{50}$]on oral application | No. of controls (untreated, only metrazol) |
|---|---|---|---|---|
| 1a | 600 | 10 | no effect until LD$_{50}$ | 10 |
| 1b | 12,000 | 180 | 165 mg/kg | 10 |
| 2a | 600 | 10 | no effect until LD$_{50}$ | 10 |
| 2b | 2000 | 30 | 300 mg/kg | 10 |
| 3a | 500 | 10 | no effect until LD$_{50}$ | 10 |
| 3b | 1,200 | 40 | <300 mg/kg | 10 |
| 4a | 500 | 10 | no effect until LD$_{50}$ | 10 |
| 4b | 1,200 | 60 | 200 mg/kg | 10 |
| 5a | 300 | 10 | no effect until LD$_{50}$ | 10 |
| 5b | 1,200 | 60 | <500 mg/kg | 10 |

Whereas thus the known Compounds 1a, 2a, 3a, 4a, and 5a have no anticonvulsant activity at dosages up to the LD$_{50}$, the compounds of the invention are effective anticonvulsants already at doses far below the LD$_{50}$.

The products of the present invention may be applied as such or in the form of corresponding salts, if desired in admixture with pharmaceutically usual carrier substances. The pharmaceutical preparations may be in the form of tablets, dragées, capsules or suppositories, or they may be in liquid form, for example in the form of solutions, suspensions or emulsions. The pharmaceutical preparations may contain the products of the present invention as active substance in an amount ranging from 5 to 500 mg and the pharmaceutically usual carriers in an amount ranging from 995 mg to 50 mg.

As the pharmaceutically usual carrier substances, there may be used those substances which do not react with the products of the invention, for example, water, gelatin, lactose, starch, magnesium stearate, talcum, vegetable oils, polyalkylene glycols, and similar substances. They may be sterilized and/or combined with stabilizers. The pharmaceutical preparations may also contain other therapeutically valuable substances.

The products of the present invention serve for the treatment of psychical diseases and disorders, for example, depressions, psychoneuroses, discords and anxiety of neurotic and psychotic genesis.

EXAMPLE 1

2-Amino-4-methyl-4-phenyl-6-chloro-4H-3,1-benzoxazine a. While stirring and cooling a solution of 49.5 g of 5-chloro-2-amino-α-methyl-α-phenylbenzyl alcohol (melting point 95°-96°C ; obtained by reacting 5-chloro-2aminobenzophenone with methyl magnesium iodide) in 200 ml of glacial acetic acid, 20 g of potassium cyanate are introduced portionwise within about 15 minutes. After another 10 minutes the reaction mixture is heated for 15 minutes on a steam bath and then diluted with water. The precipitated 5-chloro-2-ureido-α-methyl-α-phenylbenzyl alcohol is filtered, washed with water and recrystallized from aqueous ethanol. The yield is 51 g (= 88 % of theory) of colorless crystals melting at 217°-219°C.

b. 14.5 Grams of the compound prepared as described under (a) are mixed with 50 ml of hydrobromic acid of 48 percent strength and heated with stirring for 5 to 10 minutes on a steam bath and then rapidly cooled, diluted with water, the semisolid residue is taken up with methylenechloride and agitated with dilute sodium hydroxide solution. The organic solution is washed with water, dried over sodium sulphate and the solvent is evaporated; the residual crude 2-amino-4-methyl-4-phenyl-6-chloro-4H-3,1 benzoxazine is then converted into the oxalate which crystallizes from ethanol+ether in colorless crystals melting at 198°-199°C. Yield: 13 g (= 72 percent of theory). When the oxalate is agitated with methylenechloride and dilute sodium hydroxide solution and the organic phase is evaporated, the free base is obtained which, after recrystallization from benzene+petroleum ether, melts at 191°-192°C.

EXAMPLE 2:

2-Methylamino-4-methyl-4-phenyl-6-chloro-4H-3,1-benzoxazine a. A solution of 50 g of 5-chloro-2-amino-α-methyl-α-phenylbenzyl alcohol in 150 ml of ether is mixed with 30 g of methyl mustard oil and then kept for 48 hours at room temperature. The solvent is then evaporated under reduced pressure and the oily residue crystallized from toluene+ petroleum ether, to yield 53 g (= 83 percent of theory) of pure 5-chloro-2-(ω-methylthio-ureido)-α-methyl-α-phenylbenzyl alcohol melting at 153°-155°C.

b. A mixture of 32 grams of the thiourea derivative obtained under (a) with 43 g of mercury oxide in 400 ml of ethanol are stirred and refluxed for 1½ hours. The reaction mixture is filtered while hot. The solvent is then evaporated under reduced pressure. Recrystallization of the crude product from petroleum ether yields 26 g (= 90 percent of theory) of 2-methylamino-4-methyl-4-phenyl-6-chloro-4H-3,1-benzoxazine in the form of colorless crystals melting at 162°–163°C.

EXAMPLE 3

2-Ethylamino-4-methyl-4-phenyl-6-chloro-4H-3,1-benzoxazine a. A solution of 50 g of 5-chloro-2-amino-α-methyl-α-phenylbenzyl alcohol in 150 ml of ether is mixed with 35 g of ethyl mustard oil and kept for 48 hours at room temperature. Part of the solvent is then distilled off under reduced pressure and the crystalline residue is filtered to yield 53 g (= 79 percent of theory) of pure 5-chloro-2-(ω-ethylthioureido)-α-methyl-α-phenylbenzyl alcohol melting at 101°–103°C. On crystallization from benzene + petroleum ether a higher-melting modification melting at 112°–114°C is sometimes obtained.

b. 33.5 Grams of the thiourea derivative obtained under (a) are mixed with 43 g of mercury oxide in 300 ml of ethanol and stirred and refluxed for 30 minutes. The reaction mixture is filtered hot and the solvent evaporated, to yield 2-ethylamino-4-methyl-4-phenyl-6-chloro-4H-3,1-benzoxazine as an almost colorless oil which soon solidifies in crystalline form. Recrystallization from petroleum ether furnishes 26 g (=87 percent of theory) of colorless crystals melting at 90°–92°C.

c. While stirring with ice a solution of 25 g of 5-chloro-2-amino-α-methyl-α-phenylbenzyl alcohol in 200 ml of ether, 8,5 g of freshly distilled ethylisocyanate in 25 ml of ether are dropped in within 30 minutes. The batch is stirred for an hour longer at room temperature and the crystalline precipitate is filtered to yield 29 g (= 90 percent of theory) of pure 5-chloro-2-(ω-ethylureido)-α-methyl-α-phenylbenzyl alcohol melting at 135°–137°C. A specimen recrystallized from benzene reveals the identical melting point.

d. Sixteen grams of the compound obtained under (c) are heated with hydrobromic acid as described in Example 1 (b). Suitable working up furnishes 11.5 g (= 77 percent of theory) of 2-ethylamino-4-methyl-4-phenyl-6-chloro-4H-3,1-benzoxazine in colorless crystals melting at 90°–92°C which produce no melting point depression with the compound prepared as described under (b).

EXAMPLE 4:

2-Ethylamino-4-ethyl-4-phenyl-6-chloro-4H-3,1-benzoxazine a. Fifty-two grams of 5-chloro-2-amino-α-ethyl-α-phenyl-benzyl alcohol (prepared by Grignard reaction of 5-chloro-2-aminobenzophenone with ethyl magnesium bromide) are reacted with 35 g of ethyl mustard oil for 5 minutes at 105°C. Crystallization of the reaction product from a mixture of benzene and petroleum ether yields 56 g (= 80 percent of theory) of 5-chloro-2-(ω-ethylthioureido)-α-ethyl-α-phenylbenzyl alcohol in the form of almost colorless crystals melting at 141°–143°C.

b. Thirty-five grams of the compound obtained under (a) are mixed with 43 g of mercury oxide in one-half liter of ethanol and stirred and refluxed for 1½ hours, then filtered hot and the solvent is evaporated under reduced pressure. Crude 2-ethylamino-4-ethyl-4-phenyl-6-chloro-4H-3,1-benzoxazine is obtained as a yellow brown oil and is purified by column chromatography on neutral alumina (activity III) with the use of benzene as eluant, to yield 21 g (=67 percent of theory) of colorless crystals melting at 137°–138°C (from petroleum ether).

EXAMPLE 5

2-Amino-4-methyl-4-phenyl-6-chloro-4H-3,1-benzoxazine

While cooling with ice and stirring, a solution of 5.5 g of cyanogen bromide in 180 ml of methanol is slowly mixed dropwise with 12.5 g of 5-chloro-2-amino-α-methyl-α-phenylbenzyl alcohol and 4.2 g of anhydrous sodium acetate in 180 ml of methanol. The reaction mixture is kept overnight at room temperature and the bulk of the solvent is then evaporated under reduced pressure. The residue is mixed with 250 ml of water and repeatedly extracted with ether. The ether solution is washed with water, dried over sodium sulphate and the solvent is evaporated. The yellowish crystalline crude product is converted by addition of oxalic acid in acetone to 15.5 g (=86 percent of theory) of the oxalate of 2-amino-4-methyl-4-phenyl-6-chloro-4H-3,1-benzoxazine. On recrystallization from ethanol and ether the substance melts at 198°–199°C and is identical with the compound described in Example 1 (b).

EXAMPLE 6

2-Isopropylamino-4-methyl-4-phenyl-6-chloro-4H-3,1-benzoxazine a. 49.5 grams of 5-chloro-2-amino-α-methyl-α-phenyl-benzyl alcohol and 24.3 g of isopropyl mustard oil in 50 ml of petroleum ether are stirred and heated for 2 hours at 65°C. The reaction mixture is kept overnight at room temperature and the crystalline precipitate filtered and freed from any starting material left by being extracted with an equal quantity by weight of toluene, to yield 52.3 g (= 75 percent of theory) of pure 5-chloro-2-(ω-isopropylthioureido)-α-methyl-α-phenyl-benzyl alcohol melting at 161°–162°C.

b. 34.9 grams of the thiourea derivative obtained under (a) are stirred and refluxed for 1½ hours with 32.5 g of mercury oxide in 120 ml of ethanol. The hot reaction mixture is filtered and the solvent evaporated under reduced pressure, to furnish 2-isopropylamino-4-methyl-4-phenyl-6-chloro-4H-3,1-benzoxazine in crystals melting at 98°–100°C on recrystallization from petroleum ether. The yield is 25.0 g. (=79 percent of theory).

EXAMPLE 7

2-Isobutylamino-4-methyl-4-phenyl-6-chloro-4H-3,1-benzoxazine a. While stirring and cooling with water, 22.0 g of isobutylisocyanate are slowly dropped into a solution of 49.5 g of 5-chloro-2-amino-α-methyl-α-phenylbenzyl alcohol in 100 ml of toluene. The batch is stirred for 1 hour longer at room temperature and the colorless, crystalline precipitate is filtered, Yield: 65.0 g (= 94 percent of theory) of 5-chloro-2-(ω-isobutylureido)-α-methyl-α-phenylbenzyl alcohol melting at 163°–165°C.

b. 34.7 grams of the compound obtained under (a) are heated with hydrobromic acid as described in Example 1 (b). Suitable working up furnishes 2-isobutylamino-4-methyl-4-phenyl-6-chloro-4H-3,1-benzoxazine as a bright oil. From petroleum ether the compound can be obtained in colorless crystals melting at 105°–107°C. Yield 27.0 g (= 82 percent of theory).

EXAMPLE 8

2-Ethylamino-4-propyl-4-phenyl-6-chloro-4H-3,1-benzoxazine a. 55.2 grams of 5-chloro-2-amino-α-propyl-α-phenyl-benzyl alcohol (melting point 92°–93°C; obtained by reacting 5-chloro-2-aminobenzophenone with propyl magnesium bromide) are heated with 21.3 g of ethyl mustard oil in 300 ml of xylene for 3 hours at 65°C with stirring. After cooling, the precipitate formed is filtered, rinsed with xylene+petroleum ether and recrystallized from isopropanol, to yield 58.1 g (= 80 percent of theory) of 5-chloro-2-(ω-ethylthioureido)-α-propyl-α-phenyl-benzyl alcohol in the form of colorless crystals melting at 150°–151°C.

b. 36.3 grams of the compound obtained under (a) are treated with mercury oxide as described in Example 6 (b). Crystallization of the crude product from petroleum ether furnishes 30.6 g (= 93 percent of theory) of 2-ethylamino-4-propyl-4-phenyl-6-chloro-4H-3,1-benzoxazine in the form of colorless crystals melting at 101°–103°C.

EXAMPLE 9

2-Ethylamino-4-methyl-4-phenyl-6-chloro-4H-3,1-benzoxazine a. 13.6 grams of the 2-amino-4-methyl-4-phenyl-6-chloro-4H-3,1-benzoxazine obtained as described in Example 1 are agitated at room temperature with 50 ml of acetic anhydride until all has dissolved (about 10 minutes). The reaction mixture is kept for 5 hours at 0°C and the crystalline precipitate formed by then is filtered and recrystallized from aqueous ethanol, to yield 8.2 g (= 52 percent of theory) of 2-acetylamino-4-methyl-4-phenyl-4H-3,1-benzoxazine in the form of colorless crystals melting at 123°–124°C.

b. 6.3 grams of the acetyl compound obtained under (a) are introduced into a suspension of 1.0 g of lithium-aluminum hydride in 15 ml of ether while stirring and cooling with ice. The reaction mixture is refluxed for 1½ hours and then cautiously decomposed with water, and the precipitated aluminum hydroxide is filtered off. The filtrate is washed with water, dried over sodium sulphate and evaporated. The residue is recrystallized from petroleum ether, to yield 4.7 g (= 78 percent of theory) of 2-ehtylamino-4-methyl-4-phenyl-6-chloro-4H-3,1-benzoxazine in colorless crystals melting at 90°–92C, which produce no melting point depression with the compound prepared as described in Example 3.

EXAMPLE 10:

2-Phenylamino-4-methyl-4-phenyl-6-chloro-4H-3,1-benzoxazine a. A solution of 25 g of 5-chloro-2-amino-α-methyl-α-phenyl-benzylalcohol in 100 ml of methanol is combined with 26 g of phenyl-isothiocyanate and stored for 4 days at room temperature. The solvent is then removed by distillation under reduced pressure and the oily residue is crystallized from a mixture of toluene and petrol ether, whereby 30 g (78 percent of theory) of 5-chloro-2-(ω-phenyl-thioureido)-α-methyl-α-phenyl-benzylalcohol in the form of colorless crystals melting at 130°–132°C are obtained.

b. 19 g of the thiourea derivative obtained according to (a) are boiled for 1 hour under reflux, while stirring, with 20 g of mercury oxide in 150 ml of ethanol. After addition of further 10 g of mercury oxide, the whole is again heated for 1 hour and then filtered while hot. After removal of the solvent by distillation under reduced pressure, 2-phenylamino-4-methyl-4-phenyl-6-chloro-4H-3,1-benzoxazine in the form of a partly crystallizing oil is obtained. The compound can be purified via the oxalate (melting point 156°–157°C) and crystallizes then from petrol ether in the form of colorless crystals melting at 113°–115°C.

EXAMPLE 11

2-Ethylamimo-4-methyl-4-phenyl-6-chloro-4H-3,1-benzoxazine

To a solution of 6.7 g of 5-chloro-2-(ω-ethyl-thioureido)-α-methyl-α-phenyl-benzylalcohol (prepared according to Example 3 a)) in 100 ml of acetone, there are added dropwise, while stirring, at 0°–5°C, 1.4 g of sodium nitrite in 5 ml of water and then 6 g of glacial acetic acid in 5 ml of water. The whole is stirred for 5 hours at room temperature, the major part of acetone is evaporated under reduced pressure, the remaining mixture is neutralized with a sodium carbonate solution and extracted with benzene. The benzene extract is clarified with charcoal, concentrated to a small volume and combined with petrol ether, whereupon 2-ethylamino-4-methyl-4-phenyl-6-chloro-4H-3,1-benzoxazine is obtained in the form of weakly brownish crystals. By recrystallization from petrol ether, 2.0 g of colorless crystals melting at 90°–92°C are obtained.

EXAMPLE 12

2-Benzylamino-4-methyl-4-phenyl-6-chloro-4H-3,1-benzoxazine a. A solution of 18 g of benzoyl-isothiocyanate in 20 ml of toluene is slowly added dropwise, at 20°C, while stirring, to a solution of 25 g of 5-chloro-2-amino-α-methyl-α-phenyl-benzylalcohol in 80 ml of toluene. After having stirred the whole for 1 hour, the precipitate that has formed is filtered, washed with petrol ether and recrystallized from a mixture of ethanol and water with addition of charcoal. In this way, 32 g (78 percent of the theory) of 5-chloro-2-(ω-benzoylthioureido)-α-methyl-α-phenyl-benzyl-alcohol in the form of colorless crystals melting at 163°–164°C are obtained.

b. Twenty g of the thiourea prepared according to (a) are boiled under reflux for 1½ hours, while stirring, with 22 g of mercury oxide in 300 ml of ethanol. The reaction mixture is filtered while hot and the solvent is removed by evaporation under reduced pressure. Recrystallization of the residue from ethanol yields 14 g (76 percent of the theory) of 2-benzoylamino-4-methyl-4-phenyl-6-chloro-4H-3,1-benzoxazine in the form of colorless crystals melting at 185°–187°C.

c. 11.5 g of the compound prepared according to (b) are reduced with 2,5 g of lithium aluminum hydride in 300 ml of absolute ether. After having boiled for 1½ hours, while stirring under reflux, the reaction mixture is worked up as described in Example 9 (b), whereby 2-benzylamino-4-methyl-4-phenyl-6-chloro-4H-3,1-benzoxazine is obtained in the form of a colorless oil which is crystallized and dissolved again in petrol ether. The yield is 8 g (73 percent of theory).

EXAMPLE 13

2-Ethylamino-4-methyl-4-(o-chlorophenyl)-6-chloro-4H-3,1-benzoxazine a. Twenty-eight grams of 5-chloro-2-amino-α-methyl-α-(o-chlorophenyl)-benzyl alcohol (m.p. 115°–117°C, prepared by reaction of 2-amino-5,2′ dichloro-benzophenone with methyl-magnesium chloride) are heated while stirring for 3 hours to 60°–65C with 14 g of ethyl isothiocyanate in 50 ml of toluene. After the reaction mixture has been kept overnight at room temperature, the crystallized precipitate is filtered and washed with petrol ether. In this manner, 29 g (= 79 percent of theory) of 5-chloro-2-(ω-ethyl-thioureido)-α-methyl-α-(o-chlorophenyl)-benzyl alcohol are obtained as colorless crystals melting at 160°–162°C (decomposition).

b. 18.5 g of the compound prepared according to (a) are refluxed while stirring for 2 hours with 17 g of mercury oxide in 130 ml of ethanol. The reaction mixture is filtered while hot and after the solvent has been evaporated under reduced pressure 2-ethylamino-4-methyl-4-(o-chlorophenyl)-6-chloro-4H-3,1-benzoxazine is obtained in colorless crystals melting at 132°–134°C after recrystallization from petrol ether. The yield is 15 grams (= 88 percent of theory).

EXAMPLE 14

2-Cyclohexylamino-4-methyl-4-phenyl-6-chloro-4H-3,1 benzoxazine a. Twenty-five grams of 5-chloro-2-amino-α-methyl-α-phenyl-benzyl alcohol are heated while stirring for 4 hours to 60°–65°C with 14.7 g of cyclohexyl isothiocyanate in 100 ml of cyclohexane. After adding 50 ml of petrol ether the reaction mixture is allowed to cool and the crystallized precipitate is filtered and washed with petrol ether. After recrystallization from isopropanol, 24 g (= 62 percent of theory) of 5-chloro-2-(ω-cyclohexyl-thioureido)-α-methyl-α-phenyl-benzyl-alcohol are obtained as colorless crystals melting at 152°–153°C.

b. 19.5 grams of the compound prepared according to (a) are refluxed while stirring for 3 hours with 17 g of mercury oxide in 60 ml of ethanol. The reaction mixture is filtered while hot and after evaporation of the solvent under reduced pressure 2-cyclohexylamino-4-methyl-4-phenyl-6-chloro-4H-3,1-benzoxazine is obtained as an almost colorless oil. After dissolution in isopropanol and introduction of dry hydrogen chloride and ether, the hydrochloride is obtained as colorless crystals melting at 176°–179°C (decomposition). The yield is 16 grams (= 82 percent of theory).

We claim:

1. A 3,1-benzoxazine derivative of the formula I

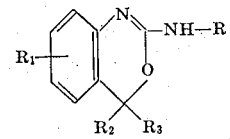

in which R is hydrogen, alkyl of one to four carbon atoms, cyclohexyl, phenyl or benzyl, $R_1$ is halogen, $R_2$ is alkyl of one to four carbon atoms and $R_3$ a phenyl or halophenyl, or the salts thereof with a physiologically compatible acid.

2. A compound as defined in claim 1 wherein R is alkyl of one to two carbon atoms.

3. A compound as defined in claim 1 wherein $R_1$ is chloride.

4. A compound as defined in claim 1 wherein $R_2$ is methyl.

5. A compound as defined in claim 1 wherein $R_3$ is phenyl.

6. A compound as defined in claim 1 wherein $R_3$ is 2-chlorophenyl.

7. 2-Amino-4-methyl-4-phenyl-6-chloro-4H-3,1-benzoxazine.

8. 2-Methylamino-4-methyl-4-phenyl-6-chloro-4H-3,1-benzoxazine.

9. 2-Ethylamino-4-methyl-4-phenyl-6-chloro-4H-3,1-benzoxazine.

10. 2-Ethylamino-4-ethyl-4-phenyl-6-chloro-4H-3,1-benzoxazine.

11. 2-Isopropylamino-4-methyl-4-phenyl-6-chloro-4H-3,1-benzoxazine.

12. 2-Isobutylamino-4-mehtyl-4-phenyl-6-chloro-4H-3,1-benzoxazine.

13. 2-Ethylamino-4-propyl-4-phenyl-6-chloro-4H-3,1-benzoxazine.

14. 2-Phenylamino-4-methyl-4-phenyl-6-chloro-4H-3,1-benzoxazine.

15. 2-Benzylamino-4-methyl-4-phenyl-6-chloro-4H-3,1-benzoxazine.

* * * * *